United States Patent

Phatak

[15] 3,686,963
[45] Aug. 29, 1972

[54] MOTION CONVERTER
[72] Inventor: Prabhakar Ramchandra Phatak, Janaki, 1205/4/2, Shivaji Nagar, Poona, 4, India
[22] Filed: Nov. 16, 1970
[21] Appl. No.: 89,812

[30] Foreign Application Priority Data

Dec. 12, 1969 Great Britain............60867/69

[52] U.S. Cl. .........................74/63, 33/18 B, 33/27 J
[51] Int. Cl. ...............................................F16h 21/12
[58] Field of Search.......74/63, 55, 567, 68; 33/18 B, 33/27 K, 27 J

[56] References Cited

UNITED STATES PATENTS

| | | | |
|---|---|---|---|
| 3,444,623 | 5/1969 | Wolf | 33/27 L |
| 2,336,361 | 12/1943 | Lear | 74/63 |
| 3,529,480 | 9/1970 | Kaspereck | 74/63 |
| 2,589,852 | 3/1952 | Overacker | 74/63 |
| 2,049,122 | 7/1936 | Kuba | 74/63 |

FOREIGN PATENTS OR APPLICATIONS 11,990 10/1885 Great Britain.................74/63

*Primary Examiner*—Meyer Perlin
*Assistant Examiner*—Wesley S. Ratliff, Jr.
*Attorney*—Waters, Roditi, Schwartz & Nissen

[57] ABSTRACT

A mechanism is provided for converting one rotary motion into at least one concentric and periodically-varying or intermittent rotary motion, and the mechanism comprises four links pivotably interconnected to form a quadrilateral linkage which can rotate about an axis passing through one of the links or a junction of two links of the linkage. A cam surrounds the axis and guides a point on one of the remaining links so as to guide and vary the shape of the linkage in its rotation about the axis, such guided linkage in rotation has relatively different and varying angular velocities about the axis at different points on the linkage. Such points provide periodic and relatively varying angular velocities to an output mechanism guided at such points. Variation of the angular velocities is controlled by the proportions of the lingage and the configuration and position of the cam.

13 Claims, 4 Drawing Figures

Patented Aug. 29, 1972　　3,686,963

3,686,963

MOTION CONVERTER

BRIEF SUMMARY OF THE INVENTION

The invention relates to mechanisms for converting rotary motion into one or more concentric and periodic rotary motions of relatively varying angular velocities.

It is known to use elliptical gears, Geneva mechanisms and variations thereof for obtaining periodically varying output angular velocities.

According to the invention, a cam is used for obtaining a periodically varying linear motion of a follower, and this invention provides for periodic variations in the rotary motions of followers.

The invention contemplates a mechanism which comprises a four-bar quadrilateral linkage which can rotate about an axis passing through one of the links or through a junction of two of the links and cam or guide means arranged to regulate the configuration of the four-bar linkage when the linkage rotates by guiding a point on one of the remaining links.

This mechanism has the particular property that the relative angular velocities and angular positions (about the axis) of different points on the rotating linkage, depend on the configuration of the linkage at each particular instant, the configuration at that instant being controlled by the cam (since the cam guides the position of every link at any given instant).

This property of the mechanism, to have simultaneously different angular velocities (about the axis of rotation) at different points on the linkage (the variations of which can be regulated by the cam), is used for the conversion of a uniform or periodic rotary motion into one or more periodic rotary motions of relatively different and varying angular velocities.

An input to the mechanism provides the rotary motion of the four-bar linkage of the mechanism either by revolving one of the links passing through the axis of revolution or by rotating one of the points on the four-bar linkage about the axis of revolution. Similarly, an output is taken from any of the other points on the four-bar linkage, which are rotating about the axis at relatively different angular velocities with respect to the input angular velocity. The motion is periodic because the variation in the angular velocities is repeated in every revolution of the four-bar linkage. The mechanism is reversible.

With a suitable choice of linkage lengths, shape of cam input and output, one or more regulated angular velocities for the output are obtained.

BRIEF DESCRIPTION OF THE DRAWING

Throughout the drawing, the same reference characters are used to indicate corresponding parts of different mechanisms.

DETAILED DESCRIPTION

Figure 1:
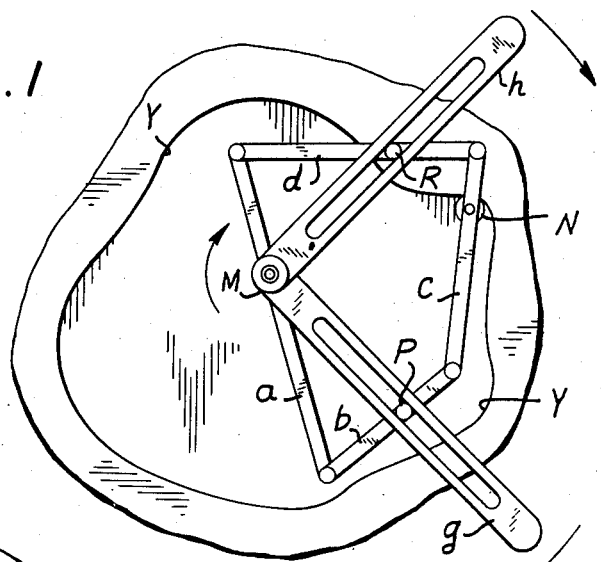
FIG. 1 is a diagrammatic illustration of one embodiment of mechanism according to the invention.

Referring to FIG. 1 of the accompanying drawings, the first embodiment comprises four links $a$, $b$, $c$ and $d$, which are pivotally connected together at their ends to form a quadrilateral linkage. The link $a$ is mounted so as to be rotatable about a fixed axis at M and the entire linkage is rotatable about this axis, which is parallel to the axis about which the four links $a$, $b$, $c$ and $d$ can pivot relative to one another as a result of the pivotal connections between adjacent links.

The link $c$ carries a cam-follower N, which cooperates with an external cam Y which, during normal operation of the mechanism, remains fixed with respect to the axis of rotation of the linkage at M and does not rotate about that axis. The cam-follower N may be maintained in contact with the cam Y by centrifugal force. Alternatively, means (not shown) may be provided for ensuring that the cam-follower N remains in contact with the cam Y, for example, the cam Y may be provided with a groove so that the cam-follower is positively retained by the cam; alternatively the cam-follower may be resiliently urged towards the cam.

The mechanism further comprises an input means by which the linkage can be caused to rotate and an output means by which an output rotation can be derived from the linkage. In FIG. 1, the input means is indicated schematically by a driving arm g, which is mounted for rotation about the axis of rotation of the linkage at M and which is formed with a longitudinal slot which engages a pin P on the link $b$. This enables a particular angular velocity about the aforesaid axis at M to be imparted to the pin P. The output means comprises a driven arm $h$, which is mounted for rotation about the aforesaid axis at M and which is formed with a longitudinal slot which engages a pin R on the link $d$. This imparts an output rotation of arm $h$ about the aforesaid axis at M and the angular velocity of arm $h$ is equal to the angular velocity of the pin R about the aforesaid axis at M.

In operation, the driving arm g is caused to rotate about the aforesaid axis at M. Although this is not necessary, the angular velocity of the driving arm g will usually be constant since the main intended use of the mechanism is to derive a varying output angular velocity from a constant input angular velocity. The rotation of the driving arm g causes the entire linkage to rotate and this rotation of the linkage is accompanied, as a result of cooperation between the cam-follower N and the cam Y, by a periodic variation in the configuration of the linkage.

The angular velocity of the link $a$ depends upon both the angular velocity of the driving arm g and the time rate of change of the angle between the links $a$ and $b$. Since this rate of change varies periodically, the angular velocity of the link $a$ is a periodic function of the angular velocity of the driving arm g. Similarly, the angular velocity of the driven arm h depends upon both the angular velocity of the link $a$ and the time rate of change of the angle between the links $a$ and $d$. Since this latter rate of change varies periodically, the angular velocity of the driven arm $h$ is a periodic function of the angular velocity of the link $a$.

It will be noted that the mechanism is reversible in the sense that the arm h can serve as the driving arm and the arm g can serve as the driven arm.

The input and output means in the first embodiment can be varied by adjusting the position of one, or both, of the pins P and R. In particular, one, but not both, of the pins P and R may be located on the link $a$, the angular velocity of the link $a$ is then equal to that of the arm $g$.

Although the cam Y has been described hereinbefore as being fixed with respect to the aforesaid axis at M during normal operation, it will be appreciated that the mechanism may be so constructed as to permit adjustment of the position of the cam Y (both by rotation and translation of the cam) before the mechanism is operated, in order to alter the periodic variation of the output angular velocity with respect to the input angular velocity. Furthermore, as is explained hereinafter, the cam Y may also be rotated about the axis at M during operation.

Figure 2:
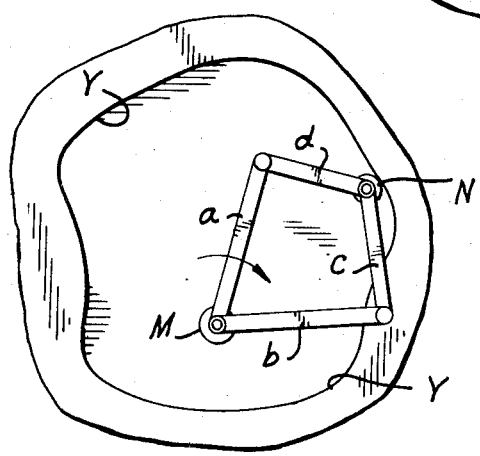
FIGS. 2 through 4 are each diagrammatic illustrations of other embodiments with the input and output members omitted.

Referring to FIG. 2 of the accompanying drawing, the second embodiment of the mechanism is similar to the first except that the axis of rotation M of the linkage as a whole coincides with the axis of the pivot that connects the link $a$ to the link $b$.

Figure 3:
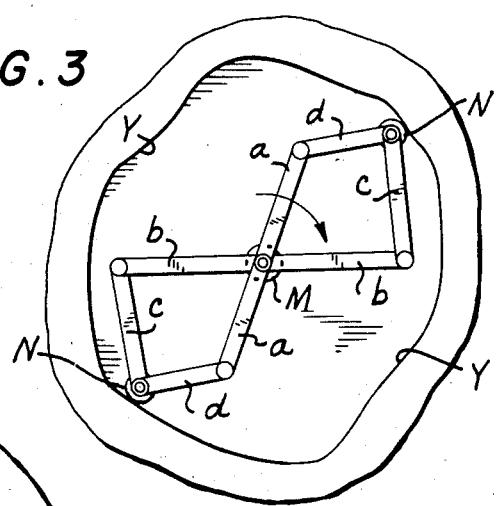

Referring to FIG. 3 of the accompanying drawing, the third embodiment of mechanism is similar to the second except that the links $a$ and $b$ are formed with similar extensions on the far side of the axis of rotation M to form second links $a$ and $b$, respectively, and second links $c$ and $d$ are added to form a second quadrilateral linkage that is similar to the first. A second cam-follower N is added to provide a balanced assembly, and the cam Y must, of course, then have an axis of symmetry.

Figure 4:
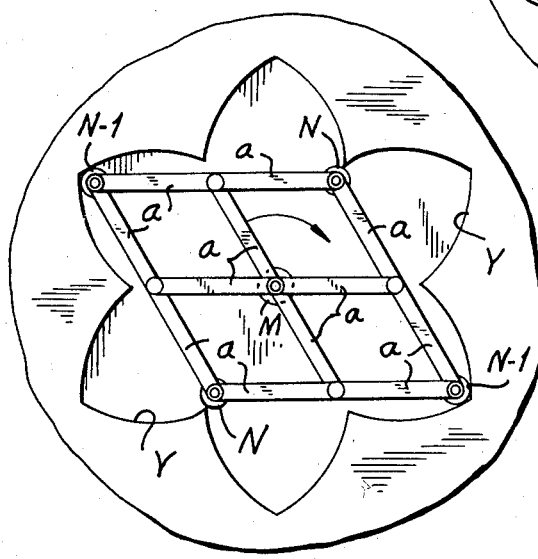

Referring to FIG. 4 of the accompanying drawing, the third embodiment of the mechanism incorporates six links of equal length pivotably connected to form four sets of diametrically symmetrical quadrilateral linkages, resulting in a rhombus of variable shape. There are two pairs of cam-followers N and $N_1$, and the cam Y is so shaped with six lobes that it can guide both the pair of cam-followers N and the pair of cam-followers $N_1$, simultaneously. In the case of the cam Y of the shape shown, the minimum and maximum angles of the rhombus are 60° and 120°, respectively.

If a cam-follower N or a cam-followers $N_1$ is rotated clockwise about the axis M, for the first 30° motion of each cam-follower $N_1$, one of the two links $a$ passing through the axis M remains stationary while the other rotates through 60°. In the next 30° of rotation of each cam-follower N, the stationary link of the first phase will rotate through 60° while the other which has moved through 60° earlier, will remain stationary. Hence, the mechanism shown in FIG. 4 can be used for converting uniform rotary motion of the cam-follower N to an intermittent motion of the links $a$.

The mechanism of the invention has numerous uses in automatic machines for providing intermittent and variable motions and quick-return motions, for indexing, and for clutches in power transmissions. It is especially useful for scissors-type rotary machines.

Additional periodic motions can be obtained by gearing the cam means to the input or output means or to an external mechanism so that it rotates about the axis of rotation of the linkage during operation of the mechanism.

The essential feature of the mechanism is the revolving linkage, the configuration of which, in rotation, is changed by the external cam means.

What is claimed is:

1. A mechanism for converting one rotary motion into at least one concentric and periodically varying rotary motion, said mechanism comprising, a plurality of links pivotably connected to form a linkage having first and second quadrilateral portions connected together at a common pivot such that said linkage can undergo pivotable movement about an axis passing through said common pivot, cam means surrounding said axis, cam-follower means on said linkage in contact with said cam means to guide and vary the shape of the linkage as it rotates about said axis, a rotatable input member pivotably connected to said linkage at said axis and slidably at one other point on said linkage, and a rotatable output member pivotably connected to said linkage at said axis and slidably at one additional point on said linkage.

2. A mechanism as claimed in claim 1, wherein said axis is coincidental with one of the pivotal interconnections of said linkage.

3. A mechanism as claimed in claim 1, wherein said axis passes through one link at a location intermediate the ends thereof.

4. A mechanism as claimed in claim 1, wherein said cam means is rotatable.

5. A mechanism as claimed in claim 1, wherein said axis is parallel to the axes of pivotal interconnection of said links.

6. A mechanism as claimed in claim 1, wherein said input and output members respectively comprise arms with slots therein, and comprising a pin on said linkage at each of said points, each pin being slidable in a respective slot in said arms.

7. A mechanism as claimed in claim 1 wherein said quadrilateral portions of said linkage are symmetrical.

8. A mechanism as claimed in claim 7 wherein said cam follower means comprises first and second cam followers on respective quadrilateral portions in diametric opposition to one another.

9. A mechanism as claimed in claim 1 wherein said linkage has third and fourth quadrilateral portions, the overall linkage forming a symmetrical parallelogram of variable shape, said links being connected together at a common pivot of the four quadrilateral portions.

10. A mechanism as claimed in claim 9 wherein said parallelogram is a rhombus.

11. A mechanism as claimed in claim 1 wherein the cam follower means comprises a cam follower connected to each quadrilateral portion at the corner thereof opposite said axis.

12. A mechanism as claimed in claim 11 wherein said cam means comprises a cam having six symmetrical lobes, each cam follower being on contact with a respective lobe.

13. A mechanism as claimed in claim 1 wherein said links are six in number, two of said links being common to said quadrilateral portions and being connected together at said axis of pivotable movement.

* * * * *